United States Patent [19]
Tomibe et al.
[11] Patent Number: 4,681,820
[45] Date of Patent: * Jul. 21, 1987

[54] METHOD OF PRODUCING AN ELECTRICALLY CONDUCTIVE POLYMERIC MATERIAL WITH ADSORBED METAL SULFIDE AND PRODUCT

[75] Inventors: Shinji Tomibe, Kyoto; Reizo Gomibuchi, Uji; Kiyofumi Takahashi, Yawata, all of Japan

[73] Assignee: Nihon Sanmo Dyeing Co., JPX

[ * ] Notice: The portion of the term of this patent subsequent to Dec. 3, 2002 has been disclaimed.

[21] Appl. No.: 736,777

[22] Filed: May 22, 1985

Related U.S. Application Data

[62] Division of Ser. No. 461,035, Jan. 26, 1983, Pat. No. 4,556,507.

[30] Foreign Application Priority Data

Dec. 14, 1982 [JP] Japan ............................... 57-217852

[51] Int. Cl.[4] ......................... B32B 9/00; B32B 19/00

[52] U.S. Cl. ................................ 428/698; 427/126.1; 427/301; 427/322; 427/430.1; 428/263; 428/389; 428/395

[58] Field of Search ..................... 427/125, 126.1, 301, 427/304, 322, 343, 419.7, 400, 430.1; 428/389, 394, 698, 395, 929, 477.7, 930, 934, 480, 704, 263, 265, 267; 252/518

[56] References Cited

U.S. PATENT DOCUMENTS

| | | | |
|---|---|---|---|
| 3,767,538 | 10/1973 | Politycki et al. | 427/322 |
| 3,867,174 | 2/1975 | Maekawa et al. | 427/301 |
| 3,940,533 | 2/1976 | Arsac | 427/125 |
| 3,983,286 | 9/1976 | Arsac | 427/301 |
| 4,234,628 | 11/1980 | DuRose | 427/304 |
| 4,378,226 | 3/1983 | Tomibe et al. | 428/394 |
| 4,556,507 | 12/1985 | Tomibe et al. | 252/519 |

*Primary Examiner*—Sadie L. Childs
*Attorney, Agent, or Firm*—Pahl, Lorusso & Loud

[57] ABSTRACT

An electrically conducting material including a polymeric material having adsorbed sulfides of a first metal selected from copper, cobalt, tin, mercury and lead and of a second metal selected from silver, gold and elements of the platinum group. The polymeric material is in the form of powder or a shaped body such as a fiber, film or string and is formed of a synthetic polymer without cyanic groups such as a polyester or a polyamide or a naturally occurring polymeric substance such as silk or wool. The electrically conducting material may be prepared by treating the polymeric material with hydrogen sulfide, and then treating the resultant material having absorbed hydrogen sulfide with (a) a source of ions containing the first metal, (b) a source of ions containing the second metal and, optionally, (c) a sulfur-containing compound to form sulfides of the first and second metals adsorbed by the polymeric material.

13 Claims, No Drawings

METHOD OF PRODUCING AN ELECTRICALLY CONDUCTIVE POLYMERIC MATERIAL WITH ADSORBED METAL SULFIDE AND PRODUCT

This is a division of application Ser. No. 461,035 filed Jan. 26, 1983, now U.S. Pat. No. 4,556,507.

BACKGROUND OF THE INVENTION

1. Field of the Invention

This invention relates to electrically conducting materials and to a method of preparing such electrically conducting materials.

2. Description of the Prior Art

Numerous methods for imparting electrical conductivity to synthetic polymeric materials in the form of shaped bodies are known in the art. For example, in U.S. Pat. No. 3,940,533 issued to Arsac, there is proposed one method for imparting electrical conductivity to polymeric shaped materials, such as polyamide fibers, in which the fibers are first contacted with hydrogen sulfide and the resulting fibers impregnated with the hydrogen sulfide are then immersed in a metal salt solution such as an aqueous copper sulfate solution, to form a deposit of metal sulfide, such as copper sulfide, on the fibers. This process, however, is not all together satisfactory in view of the fact that the copper sulfide deposit on the fibers obtained according to this process is poor in stability, especially in washability, so that the electrical conductivity is lost during storage or use. In British patent publication No. 2,078,545A (published Jan. 13, 1982), there is proposed a method in which an electrically conducting, copper sulfide-coated fiber, obtained a method such as disclosed in the above-mentioned U.S. Pat. No. 3,940,533, is treated with a reducing agent such as ascorbic acid or hydrazine to increase the atomic ratio Cu/S of the copper sulfide to between 1.5 and 2.0. Although the thus treated electrically conducting fiber exhibits superior washability in comparison with the non-treated starting fiber, a further improvement in washability is still desired in practice.

SUMMARY OF THE INVENTION

The present invention provides an electrically conducting material in the form of a polymeric material carrying adsorbed sulfides of a first metal selected from copper, cobalt, tin, mercury and of lead and a second metal selected from silver, gold and elements of the platinum group. Any substantially cyanic group-free polymeric substances may be used as the starting material, provided it is capable of adsorbing hydrogen sulfide. The starting polymeric material may be in the form of a shaped body such as fiber, film, block, plate or granule as well as in the form of powder. Not only synthetic polymeric materials but also naturally occurring polymeric materials may be used as the starting material.

The electrically conducting material of this invention, when in the form of fibers, may be advantageously utilized in clothing, carpets, interior decorative sheets, gloves or the like by themselves or in combination with other fibers because of their static resistance and affinity for dyes. When in the form of a film or plate, the electrical conductivity and transparency of the materials of this invention allow use as covers and encloses for electric parts such as integrated circuits and large-scale integrated circuits which require shielding from electrostatic charges during storage or transportation. The electrically conductive material of this invention may be incorporated as a powder into a coating composition to form electrically conductive coatings. Because of the excellent thermal stability of the sulfides, powder or granules of the electrically conductive material of this invention formed from synthetic polymers, such as polyamides, can be thermally molded to produce electrically conducting molded articles. Thus, the electrically conducting materials of this invention lend themselves to numerous applications in many fields.

In another aspect, the present invention provides a process for the preparation of the above described electrically conducting materials. The process includes treating a polymeric material having adsorbed hydrogen sulfide with ions containing the first and second metals and, optionally, with a sulfur-containing compound to form sulfides of the first and second metals adsorbed by the polymeric material.

In a further aspect, the present invention provides a method of reforming a metal sulfide-carrying, electrically conducting polymeric material, which includes treating the material with ions containing the second metal and, optionally, a sulfur-containing material.

It is, therefore, an object of the present invention to provide an electrically conducting material having excellent electrical conductivity, washability, and resistance to abrasion, heat, alkali and moisture.

Another object of the present invention is to provide a simple process which can impart excellent electrical conductivity to polymeric materials.

It is a further object of the present invention to provide a method for reforming a metal sulfide-carrying, electrically conducting polymeric material to improve its stability.

Other objects, features and advantages of the present invention will become apparent from the detailed description of the invention to follow.

DETAILED DESCRIPTION OF THE INVENTION

The polymeric materials to which electrical conductivity be imparted in accordance with the present invention include both natural and synthetic polymers capable of adsorbing hydrogen sulfide. Thus, cyanic group-containing polymers, such as polyacrylonitrile, which have no affinity for hydrogen sulfide are not suitable for the purpose of the present invention. Illustrative of suitable synthetic polymers are polymers and copolymers based on polyesters, aromatic polyamides, polyurethanes, polycarbonates, polyamides, polyamideimides, polyphenols, polyethers, polyvinylalcohols, and polyethylene oxides. Mixtures of these polymers with other polymers such as polyolefins may also be used. The synthetic polymers to be imparted with electrical conductivity may be in the form of powder or in the form of a shaped body such as a film, plate, fiber, fabric, paper, sheet, block, pellet, thread, string, rod or pipe and can contain customarily employed additives such as ultraviolet ray-adsorbers and molding aids. Suitable natural polymeric materials include polypeptides such as wool and silk and may generally be used in the form of fibers.

The electrically conducting material of this invention includes sulfides of a first metal selected from copper, cobalt, tin, mercury and lead and of a second metal selected from the group consisting of silver, gold and elements of the platinum group, i.e. ruthenium, rhodium, palladium, osmium, iridium and platinum, supported by the above-mentioned described polymeric material.

The amount of the first metal sulfide adsorbed by the polymeric material varies depending on the type of the polymeric material and on the intended electrical conductivity, but is generally in the range of about 0.5 to 30%, preferably 1 to 15%, calculated as elemental metal based on the weight of the starting polymeric material.

The amount of the sulfide of the second metal in the electrically conducting material of this invention and is, in general, such that the atomic ratio $M_2/M_1$, where $M_1$ stands for the first metal and $M_2$ stands for the second metal, is 0.0001 to 0.5, preferably 0.001–0.3, more preferably 0.01–0.2. Too small an amount of the second metal component will not to attain an improvement in washability, whereas an amount of the second metal component in excess of 0.5 of the $M_2/M_1$ atomic ratio tends to lower the electrical conductivity and is also disadvantageous from an economic point of view since the second metal is very expensive.

The electrically conducting material of the present invention may be prepared with the use of, as the starting material, the above-mentioned polymeric material having deposited thereon the first metal sulfide or the above-mentioned polymeric material carrying adsorbed hydrogen sulfide.

An electrically conducting polymeric material carrying a deposit of the first metal sulfide is preferably prepared in accordance with the method described in U.S. Pat. No. 3,940,533, the disclosure of which is hereby incorporated by reference. Briefly, the method includes treating the polymeric material with hydrogen sulfide under pressure, and treating the resulting material having adsorbed hydrogen sulfide with ions of the first metal to form the sulfide of the first metal adsorbed on or within the polymeric material. When copper is used as the first metal, the resulting product may be further treated with a reducing agent as suggested in British patent publication No. 2,078,545A. Further, the treatment with the copper-containing ions may be performed in the presence of a polyphenol, respectively such as diphenol, as a swelling agent. The electrically conducting, copper sulfide-carrying polymeric material commercially available under a trademark of "Rhodiastat", can also be suitably employed as the starting material for the preparation of the electrically conducting material of this invention. Although there is no disclosure in U.S. Pat. No. 3,940,533 with respect to the use of cobalt to form the electrically conducting layer, it has been found that treatment with cobalt ions provides an electrically conducting fiber as does treatment with copper and lead ions.

The polymeric material carrying the adsorbed first metal sulfide, optionally after washing with water, is treated in a bath which are ions containing a source of the second metal. As the source of ions containing the second metal, a salt or complex of the second metal, such as a sulfate, nitrate, chloride, acetate, benzoate, a thiocyanate complex or a thiosulfate complex, may be suitably employed. The concentration of the second metal-containing ions in the bath is generally in the range of 0.005–10 g/l, preferably 0.01–6 g/l in terms of the elemental metal. The treatment is performed at a temperature from room temperature to 100° C., preferably 30°–80° C., for a period of 0.5–20 hours, preferably 1–10 hours with the ratio by weight of the bath to the material to be treated being in the range of 5:1 to 50:1, preferably 10:1 to 30:1.

It is preferred that the treatment with the second metal-containing ions be performed in the presence of a sulfur-containing compound or be followed by a treatment with the sulfur-containing compound to further improve both the stability and the electrical conductivity of the resulting electrically conducting material.

The sulfur-containing compound is of a type which is capable of providing sulfur atoms and/or sulfur ions for reaction with the second metal to accelerate the formation of sulfides of the second metal. Illustrative of suitable sulfur-containing materials are sodium sulfide, sulfur dioxide, sodium hydrogen sulfite, sodium pyrosulfite, sulfurous acid, dithionous acid, sodium dithionite, sodium thiosulfate, thiourea dioxide, hydrogen sulfide, sodium formaldehyde sulphoxylate (RONGALITE C), zinc formaldehyde sulphoxylate (RONGALITE Z) and mixtures thereof. The sulfur-containing compound is generally used in an amount of 0.2–5 mols, preferably 0.4–3 mols per mol of the source of second metal-containing ions.

In the above embodiment, adsorption of the second metal component is preceded by the formation of first metal sulfide. In an alternative embodiment, the sulfides of first and second metals are adsorbed simultaneously on the polymeric material. In this case, a polymeric material having adsorbed hydrogen sulfide is used as the starting material. The hydrogen sulfide-carrying polymeric material may be obtained by contacting the polymeric material with hydrogen sulfide, preferably under pressure, for 0.5 to 2 hours.

In the aforementioned alternative embodiment, the hydrogen sulfide-carrying polymeric material is treated in a bath containing both first metal-containing ions and second metal-containing ions. A water-soluble salt or complex such as a chloride, a sulfate and a nitrate of the first metal is generally used as the source of first metal-containing ions. The concentration of the first metal ions in the bath is generally in the range of 10–100 g/l, preferably 20–40 g/l, in terms of elemental metal. As the source of ions containing the second metal, any of the salts or complexes as exemplified previously may be used. The concentration of the second metal-containing ions in this embodiment is the same as in the previously described embodiment.

The treatment with the first and second metal ions is generally performed at a temperature in the range from 10° to 100° C., preferably from room temperature to 60° C. Similar to the first described embodiment, it is preferred that the alternative, simultaneous treatment be carried out in the presence of or be followed by the treatment with a sulfur-containing compound of the above-mentioned type and amount.

As a result of the foregoing treatments, there is obtained the electrically conducting material in which sulfides of the first and second metals are adsorbed by the polymeric material to form a continuous, electrically conducting layer or deposit at least on the surface thereof. The X-ray diffraction pattern of the electrically conducting material of this invention in which copper and silver are used as the first and second metals, respectively, has been found to differ from that deduced from the X-ray diffraction patterns of copper sulfide and silver sulfide. The analysis of the electrically conducting material by an X-ray microanalyzer indicates that the silver exists at the same locations as the copper and sulfur. Further, in view of the fact that the electrically conducting material of this invention is of a character which could not be predicted on the basis of the properties of a polymeric material having either the sulfide of the first metal or the sulfide of the second metal, the electrically conducting layer is not considered to be a mere mixture of the first and second metal sulfides. Rather, it is believed that at least some of the first metal sulfide and the second metal sulfide are present in a mixed crystal-like form in which the second metal is associated with the sulfur atom or atoms of the first metal sulfide.

In addition to the above-described second metal, iron and nickel have been found to be effective in improving the quality of the electrically conducting material, especially in lightening the color thereof. Such an auxiliary metal component may be incorporated into the electrically conducting material in the same manner as the second metal component. Thus, a source of ions containing the auxiliary metal, such as a salt or complex thereof is added to the bath which is used for treating the polymeric material with first metal-containing ions, the source of ions containing the second metal and/or the sulfur-containing compound. If desired, the incorporation of the auxiliary metal component may be effected independently of the above treatments by treating the polymeric material in the same manner and under the same conditions as in the case of the treatment with the source of ions containing the second metal. Regardless of the mode of incorporation, the amount of auxiliary metal-containing ions used will be generally 0.01 to 0.5 mol per mol of the first metal-containing ions.

The following examples further illustrate the present invention. In the examples, the washability was determined according to the method specified in Japanese Industrial Standard (JIS) L 1045. That is, a sample was washed with a liquid containing 3 g/l of a commercially available detergent ("All Temperature CHEER" of Proctor & Gamble Inc.), with a ratio by weight of the sample to the washing liquid of 1:50. In the washability tests, a dye-fastness testing device was employed together with ten stainless balls with agitation at 50° C. for 30 min followed by washing with water and drying. Such a procedure was repeated a number of times for examination of fastness to washing. The moisture resistance test was conducted by suspending the sample from the top of a closed glass vessel containing water, the vessel being placed in a thermostat oven to maintain the sample at 60° C. and 100% humidity for a given period of time to monitor changes in electrical resistivity.

EXAMPLE 1

5 g of a commercially available, electrically conducting polyamide staple fiber having a deposit of copper sulfide (trademark: "Rhodiastat", 7 denier, manufactured by Rhone Poulenc-Textile, FRANCE) were immersed in an aqueous solution containing 2 g/l of silver nitrate and heat-treated therein at 45° C. for 3 hours. The resultant fiber was washed with water and dried to obtain an electrically conducting fiber in accordance with this invention. The results of washability tests for the product thus treated together with those for the non-treated, starting fiber are shown in Table 1.

TABLE 1

| Sample | Electrical Resistivity (Ω-cm) Number of Washing Operations | | | | | |
|---|---|---|---|---|---|---|
| | 0 | 10 | 20 | 30 | 40 | 50 |
| Treated | 3.8 × $10^2$ | 3.5 × $10^2$ | 3.2 × $10^2$ | 3.2 × $10^2$ | 3.3 × $10^2$ | 3.4 × $10^2$ |
| Non-treated | 3.6 × $10^2$ | * | — | — | — | — |

*The electrical conductivity was lost.

EXAMPLE 2

Example 1 was repeated in the same manner as described except that the treatment bath further contained 5 g/l of sodium thiosulfate and that the treatment time was reduced to 2 hours. The resultant fiber had an electrical resistivity of $1.18 \times 10^{-1}$ and no change in electrical conductivity was observed after 50 washing operations.

EXAMPLE 3

A polyamide knit (Toyobo Nylon, 70 denier, 24 filaments) weighing 5 g was suspended within an autoclave into which hydrogen sulfide was charged until the inside pressure reached 5 Kg/cm$^2$. The treatment of the knit with hydrogen sulfide was carried out at 20° C. for 1 hour. The resulting knit having adsorbed hydrogen sulfide was then immersed in 100 ml of an aqueous solution containing 30 g/l of cupric sulfate and 1 g/l silver nitrate, and treated therein at 20° C. for 30 min and then at 50° C. for 1 hour. The thus treated knit was olive-gray in color and had an electrical resistivity of $1.46 \times 10^{-1}$ Ω-cm. The electrical conductivity remained unchanged through a 100 days-moisture-resistance test.

For the purpose of comparison, the above procedure was repeated in the same manner as described above except that no silver nitrate was used. The resulting knit had an electrical resistivity of $1.38 \times 10^{-1}$ Ω-cm. However, the electrical conductivity was lost after 15 days from the initiation of the moisture-resistance test. The results of the washability test were as shown in Table 2.

EXAMPLE 4

Example 3 was repeated in the same manner as described except that the treatment bath contained 15 g/l of sodium thiosulfate in addition to the cupric sulfate and silver nitrate, thereby yielding a brown-gray, electrically conducting knit having an electrical resistivity of $1.18 \times 10^{-1}$ Ω-cm. During the course of the treatment, there was observed a small amount of precipitates. No appreciable change was observed after a 100 days-moisture-resistance test. The washability test gave the results shown in Table 2.

TABLE 2

| Sample | Electrical Resistivity (Ωcm) Number of washing Operation | | | |
|---|---|---|---|---|
| | 0 | 10 | 20 | 30 |
| Example 3 | 1.46 × $10^{-1}$ | 2.5 × $10^2$ | 4.1 × $10^5$ | * |
| Example 4 | 1.18 × $10^{-1}$ | 1.22 × $10^{-1}$ | 1.38 × $10^{-1}$ | 2.2 × $10^{-1}$ |
| Control | 1.38 × $10^{-1}$ | * | — | — |

*The electrical conductivity was lost.

EXAMPLE 5

Example 4 was repeated in the same manner as described except that silver sulfate, palladium chloride, gold chloride and platinum chloride were each used in place of silver nitrate, obtaining an improvement in moisture-resistance. Further, Example 4 was repeated using sodium dithionite in place of sodium thiosulfate, with the results similar to those for sodium thiosulfate.

EXAMPLE 6

A polyamide knit (Toyobo Nylon, 70 deniers, 24 filaments) weighing 5 g was suspended within an autoclave into which was charged hydrogen sulfide until the inside pressure reached 5 $Kg/cm^2$, and treated therein at 20° C. for 1 hour. The resulting knit with hydrogen adsorbed sulfide was then treated in an aqueous bath containing 30 g/l of cupric sulfate at 20° C. for 30 min. Subsequently, 0.2 g of palladium chloride and 2 g of sodium thiosulfate were added to the bath and the resulting mixture was heated at 50° C. and maintained at that temperature for 2 hours, thereby yielding an electrically conducting knit product having an electrical resistivity of $3.1\times10^{-1}$ Ω-cm. The product withstood 30 washings.

EXAMPLE 6

Example 5 was repeated in the same manner as described except that palladium chloride was replaced with various amounts of silver nitrate, thereby obtaining electrically conducting knit materials having various Ag/Cu atomic ratios as shown in Table 3. The washability test results are also shown in Table 3.

TABLE 3

| Ag/Cu Atomic Ratio | Electrical Resistivity (Ω-cm) Before Washing | After 10 Times | After 20 Times | After 30 Times |
|---|---|---|---|---|
| 0 | $3.95 \times 10^{-1}$ | * | — | — |
| 0.0006 | $3.67 \times 10^{-1}$ | $1.3 \times 10^{1}$ | $7.2 \times 10^{4}$ | * |
| 0.0016 | $3.78 \times 10^{-1}$ | $3.9 \times 10^{-1}$ | $5.6 \times 10^{1}$ | $1.6 \times 10^{3}$ |
| 0.012 | $3.62 \times 10^{-1}$ | $3.6 \times 10^{-1}$ | $4.11 \times 10^{-1}$ | $7.6 \times 10^{-1}$ |
| 0.15 | $4.28 \times 10^{-1}$ | $4.16 \times 10^{-1}$ | $4.23 \times 10^{-1}$ | $5.1 \times 10^{-1}$ |
| 0.28 | $1.81 \times 10^{1}$ | $1.5 \times 10^{1}$ | $1.76 \times 10^{1}$ | $1.78 \times 10^{1}$ |
| 0.45 | $9.89 \times 10^{3}$ | $1.05 \times 10^{4}$ | $9.82 \times 10^{3}$ | $9.86 \times 10^{3}$ |

*The electrical conductivity was lost.

EXAMPLE 7

Example 3 was repeated using a polyethylene terephthalate yarn (Trademark: TETORON, 150 deniers, 30 filaments, manufactured by Toray Co., Ltd., JAPAN), an aromatic polyamide fiber (Trademark: CONEX, manufactured by Teijn Co., Ltd., JAPAN), a polychlal fiber (Trademark: CODELAN, manufactured by Kojin Co., Ltd., JAPAN, a copolymer of vinyl alcohol and vinyl chloride), a polyurethane film (Trademark: OPELON, manufactured by Toray Co., Ltd., JAPAN), a polyester powder and a polyamide film, respectively, in place of the polyamide knit, thereby giving electrically conducting materials which withstood the 100 days-moisture-resistance test.

EXAMPLE 8

A polyamide knit (Toyobo Nylon, 70 denier, 24 filaments) weighing 5 g was suspended within an autoclave into which hydrogen sulfide was charged until the inside pressure reached 5 $Kg/cm^2$. The treatment of the knit with hydrogen sulfide was carried out at 20° C. for 1 hour. The resulting knit having adsorbed hydrogen sulfide was then immersed in 100 ml of an aqueous solution containing 30 g/l of cobalt acetate, and treated therein at 20° C. for 30 min. Subsequently, 0.2 g of silver nitrate and 2 g of sodium thiosulfate were added to the reaction mixture for reaction therewith at 50° C. for 2 hours. The thus treated knit was dark brown in color and had an electrical resistivity of $3.6\times10^{-1}$ Ω-cm. The electrical conductivity remained unchanged through the 100 days-moisture-resistance test.

For the purpose of comparison, the above procedure was repeated in the same manner as described above except that no silver nitrate was used. The resulting knit had an electrical resistivity of $3.2\times10^{-1}$ Ω-cm. However, the electrical conductivity was lost after 15 days from the initiation of the moisture-resistance test. The results of the washability test were as shown in Table 4.

EXAMPLE 9

Example 8 was repeated in the same manner as described except that cobalt acetate was replaced with lead acetate, thereby giving a dark gray, electrically conducting knit having an electrical resistivity of $1.2\times10^{4}$ Ω-cm. No appreciable change was observed after the 100 days-moisture-resistance test. The washability test gave the results shown in Table 4. For the purpose of comparison, the above procedure was repeated in the same manner as described above, except that no silver nitrate was used. The resultant knit had an electrical resistivity of $1.4\times10^{4}$ Ω-cm. However, the electrical conductivity was lost after 15 days from the initiation of the moisture-resistance test. The results of the washability test are also shown in Table 4.

TABLE 4

| Sample | Electrical Resistivity (Ω-cm) Number of Washing Operations: 0 | 10 | 20 | 30 |
|---|---|---|---|---|
| Example 8 | $3.6 \times 10^{-1}$ | $3.5 \times 10^{-1}$ | $6.0 \times 10^{-1}$ | $2.5 \times 10^{0}$ |
| Control | $3.2 \times 10^{-1}$ | * | — | — |
| Example 9 | $1.2 \times 10^{4}$ | $1.2 \times 10^{4}$ | $2.0 \times 10^{4}$ | $3.2 \times 10^{4}$ |
| Control | $1.4 \times 10^{4}$ | * | — | — |

*The electrical conductivity was lost.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

We claim:

1. A method of improving the electrical stability of an electrically conducting article comprising a sulfide of a first metal adsorbed on a substantially cyanic group-free polymeric material, said first metal being selected from the group consisting of copper, cobalt, tin, mercury and lead, comprising treating said polymeric material with a source of ions containing a second metal selected from the group consisting of silver, gold and elements of platinum group.

2. A method as claimed in claim 1, wherein said treatment is conducted in the presence of a sulfur-containing compound.

3. A method as claimed in claim 1, further comprising, after the treatment with ions containing the second metal, treating the product with a sulfur-containing compound.

4. A method as claimed in claim 2, wherein said sulfur-containing compound is selected from the group consisting of sodium sulfide, sulfur dioxide, sodium hydrogen sulfite, sodium pyrosulfite, sulfurous acid, dithionous acid, sodium dithionite, sodium thiosulfate, thiourea dioxide, hydrogen sulfide, sodium formaldehyde sulphoxylate, zinc formaldehyde sulphoxylate and mixtures thereof.

5. A method of preparing an electrically conducting material, comprising treating a substantially cyanic group-free polymeric material having adsorbed hydrogen sulfide with (a) a source of ions containing a first metal selected from the group consisting of copper, lead, tin, mercury and cobalt and (b) a source of ions containing a second metal selected from the group consisting of silver, gold and elements of the platinum group, to form sulfides of said first and second metals on said polymeric material.

6. A method as claimed in claim 5, wherein the treatment with components (a) and (b) is within the same treating bath.

7. A method as claimed in claim 5, wherein the treatment with component (b) is separate from and subsequent to the treatment with component (a).

8. A method as claimed in claim 5, wherein said treatment is followed by a treatment with a sulfur-containing compound.

9. A method as claimed in claim 5, wherein said treatment is carried out in the presence of a sulfur-containing compound.

10. A method as claimed in claim 8, wherein said sulfur-containing compound is selected from the group consisting of sodium sulfide, sulfur dioxide, sodium hydrogen sulfite, sodium pyrosulfite, sulfurous acid, dithionous acid, sodium dithionite, sodium thiosulfate, thiourea dioxide, hydrogen sulfide, sodium formaldehyde sulphoxylate, zinc formaldehyde sulphoxylate and mixtures thereof.

11. The product obtained by the process of claim 1.

12. The product obtained by the process of claim 3.

13. The product obtained by the process of claim 5.

* * * * *

UNITED STATES PATENT AND TRADEMARK OFFICE

CERTIFICATE OF CORRECTION

PATENT NO. : 4,681,820

DATED : July 21, 1987

INVENTOR(S) : TOMIBE et al

It is certified that error appears in the above—identified patent and that said Letters Patent is hereby corrected as shown below:

In the ABSTRACT, 13th line "absorbed" should read --adsorbed--;

Col. 1, line 34, after "obtained" insert --by--;

line 47, "of lead and" should read --lead and of--; and line 50, "substances" should read --substance--.

Col. 3, line 10, delete "and";

line 15, delete "to";

line 41, delete "respectively"; and line 55, "bath which are ions containing" should read --bath containing ions which are--.

Col. 6, in the heading of TABLE 2, "Operation" should read --Operations--.

Col. 7, lines 12 and 13, "hydrogen adsorbed" should read --adsorbed hydrogen--.

Signed and Sealed this

Twenty-sixth Day of April, 1988

*Attest:*

DONALD J. QUIGG

*Attesting Officer* *Commissioner of Patents and Trademarks*